Feb. 11, 1969  H. STÜRMER  3,426,875
ELECTROMAGNETIC CLUTCH
Filed June 26, 1967  Sheet 1 of 2

INVENTOR
Hans STÜRMER
By

Michael S. Striker his ATTORNEY

Feb. 11, 1969     H. STÜRMER     3,426,875
ELECTROMAGNETIC CLUTCH
Filed June 26, 1967     Sheet 2 of 2
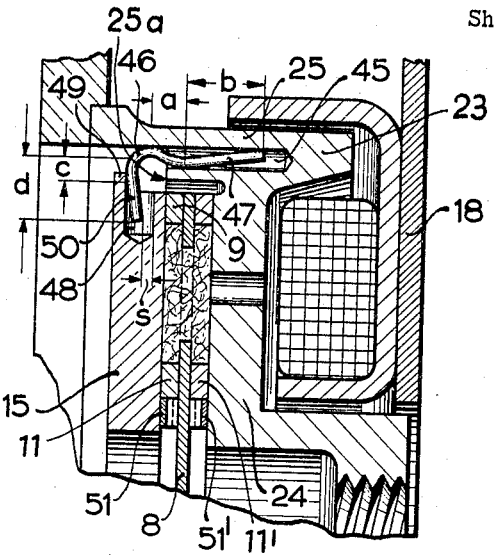
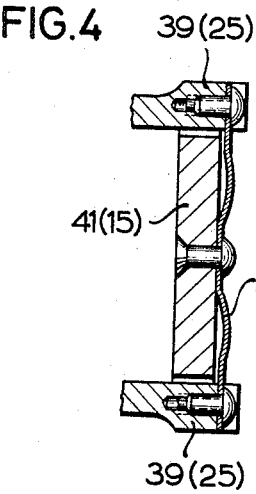
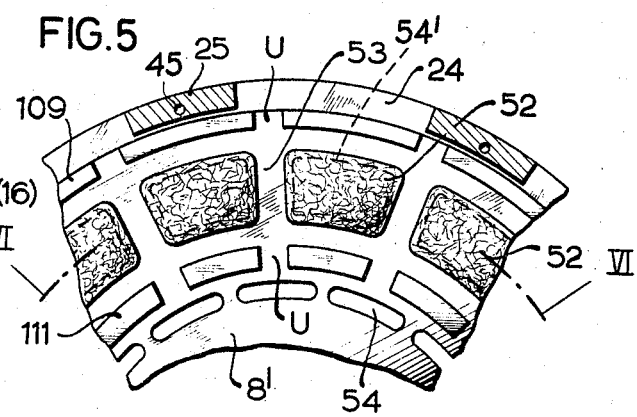
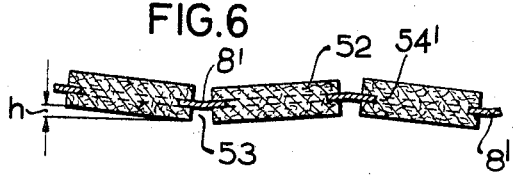
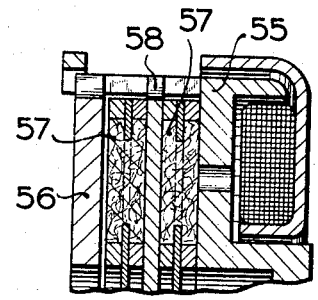
INVENTOR
Hans STÜRMER
By
*Richard J. Stricu*
his ATTORNEY //patents.google.com/patent/US3426875

United States Patent Office 3,426,875
Patented Feb. 11, 1969

3,426,875
ELECTROMAGNETIC CLUTCH
Hans Stürmer, Stuttgart, Germany, assignor to Robert Bosch G.m.b.H., Stuttgart, Germany
Filed June 26, 1967, Ser. No. 648,726
Claims priority, application Germany, Aug. 19, 1966,
B 88,536
U.S. Cl. 192—48.2        11 Claims
Int. Cl. F16d 27/08, 27/14, 13/60

ABSTRACT OF THE DISCLOSURE

The clutch plate of a dry magnetic clutch is disposed between a rotary pressure plate and an axially movable rotary armature plate which latter can be attracted toward the pressure plate by an electromagnet to clamp the clutch plate between the rotary plates. The clutch plate comprises a flat or corrugated disk which consists of magnetically conductive material and carries pairs of concentric inner and outer pole rings, and friction facings interposed between the pole rings. The disk has an annulus of windows provided between the inner and outer pole rings.

Coupling pins limit axial movements of the armature plate away from the clutch plate and compensate for wear by changing their positions with reference to the pressure plate to the extent corresponding to wear on the clutch plate and/or the rotary plates.

BACKGROUND OF THE INVENTION

The present invention relates to magnetic clutches in general, and more particularly to improvements in clutches of the type wherein a clutch plate carries a friction facing and can be clamped between rotary parts to transmit torque from such rotary parts to a driven member.

A drawback of presently known magnetic clutches of the class to which my invention pertains is that they must be provided wtih electromagnets which are very large in comparison with the magnitude of applied forces. If the size of the electromagnet is reduced, the clutch must be provided with additional parts, such as a dished spring and a power train, which raise the manufacturing cost and contribute to the bulk of the clutch. Reference may be had to German Patent No. 1,122,840. Furthermore, the mass of driven parts is excessive which is particularly undesirable in transmissions for automotive vehicles because it can cause overloading of the synchronizing system. Still further, such clutches require excessive energizing currents for engagement of driving and driven parts.

SUMMARY OF THE INVENTION

It is an important object of the present invention to provide a novel and improved magnetic clutch of simple and compact design wherein the mass of driven parts is considerably less than in presently known magnetic clutches.

Another object of the invention is to provide a magnetic clutch whose energy requirements are low and which requires little maintenance.

A further object of the invention is ot provide a dry magnetic clutch which can be used to transmit torque to one or more driven members, either simultaneously or independently of each other.

An additional object of the invention is to provide a dry magnetic clutch which is capable of automatically compensating for wear on its frictionally engaged parts.

A concomitant object of the invention is to provide a novel clutch plate which can be utilized in a clutch of the above outlined character.

Briefly outlined, one feature of my present invention resides in the provision of a dry magnetic clutch which comprises rotary driving means preferably including a driving shaft and a flywheel affixed to the driving shaft, rotary driven means preferably including a driven shaft which is coaxial with the driving shaft, a pressure plate which is rigid with the driving means and is axially spaced from the flywheel, an axially movable armature which is connected to the flywheel by leaf springs serving to transmit torque to and to bias the armature axially and away from the pressure plate, a clutch plate disposed between the armature and the pressure plate and axially movably connected with the driven means to transmit torque when engaged by the parts which rotate with the driving means, and current-operated means preferably including a ring-shaped coil affixed to a stationary housing and energizable to move the armature against the clutch plate by overcoming the opposition of leaf springs so as to maintain the clutch plate in frictional torque-receiving engagement with the armature and pressure plate.

The clutch plate comprises a flat or corrugated disk of magnetically conductive material, inner and an outer pole rings provided at each side of the disk, and a friction facing of diagrammatic material provided at each side of the disk between the respective pole rings. The disk is formed with an annulus of windows or cutouts disposed between the inner and outer pole rings and comprises narrow webs or ribs which separate the windows from each other.

The clutch may be of the simplex or multiplex type, and the space between the armature and the pressure plate may accommodate two or more clutch plates.

In accordance with another feature of my invention, the clutch further comprises coupling means serving to limit axial movements of the armature away from the pressure plate and clutch plate, i.e., to oppose the bias of the leaf springs. Such coupling means preferably comprises substantially L-shaped pins having first legs received with friction in axially parallel bores or recesses machined into the pressure plate radially outwardly of the clutch plate and second legs received with clearance in bores or recesses extending radially inwardly from the peripheral surface of the armature. The magnetic force produced on energization of the current-operated means suffices to displace the first legs when the armature is attracted toward the pressure plate and to thus compensate for wear on the frictionally engaged parts. However, the first legs are held in the pressure plate with sufficient friction to prevent excessive axial movements of the armature away from the pressure plate when the current-operated means is deenergized and the leaf springs shift the armature away from the clutch plate to the extent determined by the clearance with which the second legs of the pins are received in the recesses of the armature.

The novel features which are considered as characteristic of the invention are set forth in particular in the appended claims. The improved magnetic clutch itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is an enlarged fragmentary axial sectional view of the clutch shown in FIG. 1, the section being taken in a plane which is inclined with reference to the plane of FIG. 1;

FIG. 4 is a larger-scale fragmentary view as seen in the direction of the arrow IV in FIG. 1;

FIG. 5 is a fragmentary transverse sectional view of a second magnetic clutch which utilizes a clutch plate provided with a corrugated disk;

FIG. 6 is a section substantially as seen in the direction of arrows from the line VI—VI of FIG. 5; and FIG. 7 is a fragmentary axial sectional view of a third magnetic clutch which utilizes a multiplex clutch plate.

DESCRIPTION OF THE PREFERRED EMBODIMENTS

Figure 1:
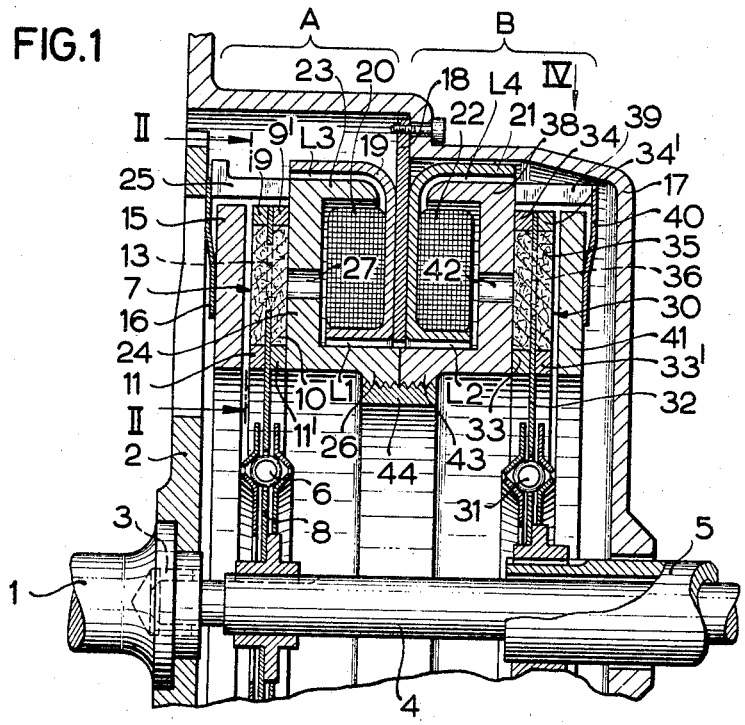
FIG. 1 is a fragmentary axial sectional view of a duplex dry magnetic clutch which embodies one form of my invention.

Referring first to FIG. 1, there is shown a dry magnetic clutch which comprises a driving means including a driving shaft 1 and a flywheel 2. The driving shaft 1 may be constituted by the crankshaft of an internal combustion engine and its right-hand end is rigid with the flywheel 2. The right-hand end of the shaft 1 accommodates a pilot bearing 3 for the left-hand end of a first or inner driven shaft 4. A hollow second or outer driven shaft 5 surrounds and is rotatable relative to the inner shaft 4.

The clutch of FIG. 1 is a duplex clutch and comprises two clutches or clutching units A and B. The left-hand clutching unit A includes a specially constructed clutch plate 7 having a flat disk 8 which is non-rotatably but axially movably secured to the driven shaft 4 and carries vibration damper springs 6. The disk 8 consists of magnetically conductive material and carries two outer and two inner pole rings 9, 9′ and 11, 11′. The rings 9, 11 are mirror symmetrical to rings 9′, 11′ with reference to the plane of disk 8 and are separated from each other by an annular friction facing 10. A second friction facing 10 is provided between the pole rings 9′, 11′. The peripheral surfaces of the outer pole rings 9, 9′ are flush with the peripheral surface of the disk 8.

Figure 2:
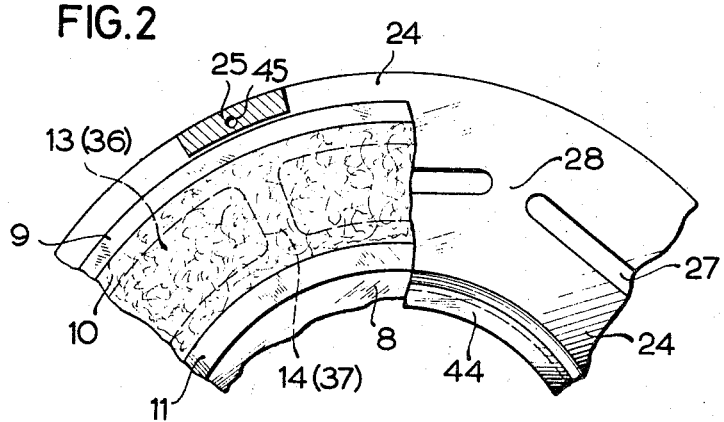
FIG. 2 is a fragmentary transverse vertical sectional view as seen in the direction of arrows from the line II—II of FIG. 1.

The disk 8 is formed with an annulus of weight-reducing cutouts or windows 13 (see also FIG. 2) which are disposed between the pole rings 9, 9′ and 11, 11′ and are separated from each other by relatively narrow webs or ribs 14. The length of each cutout 13, as seen in the circumferential direction of the disk 8, exceeds its width as viewed in the radical direction of the disk.

A plate-like armature 15 is disposed in the space between the clutch plate 7 and flywheel 2. This armature 15 is axially movably but non-rotatably affixed to the flywheel 2 by a series of biasing elements in the form of leaf springs 16. When the clutching unit A is engaged, the springs 16 transmit torque from the flywheel 2 to the armature 15 and the latter drives the clutch plate 7 and hence the driven shaft 4. When the clutching unit A is disengaged, the springs 16 move the armature 15 axially and away from the clutch plate 7.

The clutch further comprises a housing or bell 17 containing an annular partition 18 which divides its interior into a pair of chambers, one for each of the clutching units A, B. Each of these chambers accommodates an electromagnet including an annular channel-shaped receiver or holder 19 or 21 and a coil 20 or 22. The partition 18 cooperates with the holders 19, 21 to properly center the coils 20, 22. The holder 19 of the clutching unit A further receives with clearance the radially outermost portion or rim 23 of a pressure plate 24. The rim 23 is provided with extensions or arms 25 secured to the flywheel 2. The arms 25 form a ring whose internal diameter exceeds the external diameters of the armature 15 and clutch plate 7. The internal diameter of the pressure plate 24 equals the internal diameters of the armature 15 and inner pole rings 11, 11′. The pressure plate 24 has an inwardly extending annular projection or portion 26 located inwardly of the holder 19 and extending into the area surrounded by the partition 18. The internal surface of the projection 26 is threaded.

The pressure plate 24 is formed with several windows or cutouts 27 (see also FIG. 2) which register with the cutouts 13 of the disk 8. The width of the cutouts 27 (as seen in the radial direction of the pressure plate 24 or disk 8) is less than the width of the cutouts 13. The cutouts 27 are separated from each other by relatively narrow webs or ribs 28 shown in FIG. 2.

The right-hand clutching unit B is similar to the clutching unit A. It comprises a clutch plate 30 whose disk 32 is provided with vibration damper springs 31 and is non-rotatably but axially movably affixed to the driven shaft 5. The disk 32 carries inner pole rings 33, 33′, outer pole rings 34, 34′, friction facings 35, and is formed with cutouts or windows 36 shown in FIG. 2 and separated from each other by webs or ribs 37. A pressure plate 38 is installed between the coil 22 and clutch disk 30 and is provided with cutouts or windows 42 registering with the cutouts 36. The rim of the pressure plate 38 is provided with several substantially axially extending arms or extensions 39 which carry leaf springs 40 affixed to a plate-like armature 41, the latter being located to the right of the clutch plate 30.

FIG. 4 illustrates the manner in which the leaf springs 40 are mounted on the arms 39 and armature 41. Each of the springs 40 resembles a V-shaped or U-shaped body whose ends are affixed to a pair of adjoining arms 39 by means of rivets or analogous fasteners. The apex of each spring 40 is riveted to the armature 41. The apices of the springs 40 extend substantially to the central region of the armature 41 (see FIG. 1). The springs 16 are riveted to the armature 15 and flywheel 2 or arms 25 in the same way as described in connection with the springs 40. Each of the springs 16, 40 is bent in such a way that it tends to move the respective armature 15, 41 away from the associated clutch plate 7, 30. Thus, when the clutching units A, B are disengaged, the armatures 15, 41 assume the axial positions shown in FIG. 1.

The pressure plate 38 of the clutching unit B has a projection 43 which is mirror symmetrical to the projection 26 with reference to the central plane of the partition 18 and is provided with internal threads. An externally threaded fastener ring 43 meshes with the projections 26, 43 so that the two pressure plates form a rigid unit. The external surfaces of the projections 26, 43 are separated from the internal surfaces of holders 19, 21 by air gaps L1, L2.

Two additional air gaps L3, L4 are provided between the peripheral surfaces of the pressure plates 24, 38 and the adjoining internal surfaces of the holders 19, 21.

A face 25a of each of the arms 25 is provided with a blind bore or recess 45 shown in FIG. 3. This face 25a is disposed radially outwardly of the pole ring 9 and the blind bore 45 extends well into the rim 23, i.e., into the radially outermost portion of the pressure plate 24. Each bore 45 accommodates the longer leg 47 of a specially configured coupling pin 46 consisting of wire made of spring steel stock. The leg 47 is slightly bent to form two mutually inclined sections including a longer section nearer to the bottom region of the bore 45 and a shorter section which extends from the bore. The shorter leg 50 of the coupling pin 46 extends into a radial blind bore or recess 48 provided in the peripheral surface of the armature 15. The number of bores 45 equals the number of bores 48. The angle between the sections of the longer leg 47 is such that the pin 46 is held in the bore 45 in prestressed condition and is in three-point contact with the pressure plate 24. Thus, the ends of the leg 47 bear against the adjoining surface of the arm 25 at two axially spaced points and the medium portion of the leg 47 bears against the adjoining surface of the arm 25 opposite the peripheral surface of the clutch plate 7. The distance $a$ is less than the distance $b$, i.e., the effort arm of the longer section of the leg 47 is greater than the effort arm of the shorter section.

The armature 15 is provided with a lip or nose 49 which extends radially beyond the blind bore 48 and serves as a fulcrum for the shorter leg 50 of the pin 46 when the clutching unit A is engaged. The character $d$ denotes the effective length of the leg 50 (between the free end of the leg 50 and the axis of the bore 45) and the character $c$ denotes the effort arm of the shorter section of the leg 50 (between the axis of the bore 45 and that point of the lip 49 which is engaged by the pin 46). The character $s$ denotes the distance between the rightmost portion of the blind bore 48 and the free end of the leg 50. This distance $s$ corresponds to the maximum clearance between the clutch plate 7 and armature 15. The right-hand holder 38 of FIG. 1 also carries a set of coupling pins which are configured and mounted in the same way as the pin 46 of FIG. 3. This latter illustration further shows two corrugated springs 51, 51' which are respectively inserted between the parts 8, 15 and 8, 24. These springs are immediately adjacent to the internal surfaces of the pole ring 11, 11'. It will be noted that the springs 51, 51' are not shown in FIG. 1 but it is clear that each of the clutching units A, B is or may be provided with such springs. Their purpose is to prevent adherence of pressure plates 24, 38 and armatures 15, 41 to the respective sides of the clutch plate 7, 30 due to residual magnetism when the clutching units are disengaged.

Another mode of preventing adherence due to residual magnetism (remanence) is illustrated in FIGS. 5 and 6. In this embodiment of the present invention, the entire clutch disk 8' resembles or acts not unlike a corrugated spring. The pole rings are interrupted at U (see the rings 109, 111 of FIG. 5) to allow for flexing of the disk 8'. The facing comprises a series of segments 52 which are spaced from each other at 53, as seen in the circumferential direction of the disk 8'. The latter is further provided with cutouts or windows 54 which are located radially inwardly of the inner pole rings (see the pole ring 111 in FIG. 5). These cutouts 54 are located radially inwardly of gaps between the segments 52. The cutouts in the clutch disk between the interrupted pole rings and in the regions of the segments 52 are indicated with 54'. The disk 8' can be flexed in the region of each gap 53. Each second portion of the disk 8' is bent in one direction and the remaining portions of the disk are bent in the other direction. FIG. 6 shows a portion of the disk 8' in end elevational view and it will be seen that successive panels of this disk (between successive gaps 53) are bent in opposite directions. When the clutching unit using the disk 8' is engaged, the latter is deformed into a flat body so that each of the segments 52 comes into full face-to-face engagement with an armature or with a pressure plate. An important advantage of the structure shown in FIGS. 5 and 6 is that the corrugated springs 51, 51' may be dispensed with, that the engagement of the clutching unit is smoother due to innate elasticity of the disk 8', and that this disk insures more uniform distribution of loads. In FIG. 6, the deformation $h$ of the disk 8' is greatly exaggerated for the sake of clarity; in actual practice, the deformation $h$ may be in the range of one or more tenths of a millimeter.

It is clear that the clutch of FIG. 1 can be simplified by omitting one of the clutching units, for example, by omitting the clutching unit B. Such simplex clutches can be used with advantage in automatic transmissions to interrupt the tractive force, in compressors of refrigerating and air conditioning apparatus, in cooling apparatus for use in automotive vehicles, in machine tools and/or for many other purposes.

The duplex clutch of FIG. 1 can be used with advantage in automatic transmissions wherein the transmission of torque should not be interrupted. Thus, the two clutching units A, B can be engaged or disengaged one after the other so that the clutching unit A transmits torque from the driving shaft 1 to the driven shaft 4 or that the clutching unit B transmits torque from the shaft 1 to the driven shaft 5. The operation of the clutching units A, B can be programmed by resorting to a suitable transistorized electronic control system.

When the left-hand clutching unit A is engaged by completing the circuit of the coil 20, the magnetic force lines pass from the coil 20, through the radially outer part of the pressure plate 24, outer pole rings 9, 9', armature 15, inner pole rings 11, 11', and the radially inner part of the pressure plate 24. The armature 15 is attracted against the left-hand face of the clutch plate 7 and the latter is firmly clamped between the rotary parts 15 and 24. The springs 16 transmit torque from the flywheel 2 to the armature 15 and the pressure plate 24 is rigidly secured to the flywheel by arms 25.

When the clutching unit A is disengaged, the springs 16 move the armature 15 away from the clutch plate 7. The extent to which the armature 15 can move away from the clutch plate 7 is determined by the coupling pins 46 which are reset automatically in response to wear on the clutching unit A. When the unit A is engaged, the pins 46 are automatically compelled to penetrate deeper into the respective bores 45 to compensate for wear on the parts 15, 7 and 24. Such resetting of the pins 46 is effected by the lips 49 which push the respective longer legs 47 deeper into the bores 45. Self-locking of pins 46 is prevented because the effort arm $a$ (FIG. 3) is shorter than the effort arm $b$. When the clutching unit A is disengaged, the surface surrounding the bore 45 engages the free end of the shorter leg 50 after the armature 15 has moved axially through the distance $s$. The force of springs 16 is then taken up by the legs 50 (effort arm $d$ in FIG. 3) and the shorter sections of the legs 47 (effort arm $a$ in FIG. 3) insure a self-locking action which prevents withdrawal of legs 47 from the respective bores 45. Thus, the distance $s$ between the armature 15 and clutch plate 7 is always the same when the clutching unit A is disengaged, irrespective of the wear on the parts 15, 7 and 24.

The operation of the right-hand clutching unit B is clearly analogous to that of the clutching unit A.

A very important advantage of the coupling pins 46 is that they insure proper engagement of the clutch in response to energization of the coil or coils by a current of unchanging and relatively low strength. This is due to the fact that the distance covered by an armature into engagement with the associated clutch plate remains the same irrespective of the wear on the armature, pressure plate and/or clutch plate. Such automatic compensation for wear further insures unchanging operation of the controls which cause engagement or disengagement of the clutch, and this is particularly important when the clutch is being engaged. The pole rings can be placed into full face-to-face engagement with the pressure plate and with the armature, irrespective of the wear thereon, i.e., no gaps will develop between such pole rings and the adjoining parts of the clutch because the faces of the pole rings are flush with the faces of the friction facings. Due to the fact that the clutch plate can engage with and is then clamped between two torque-transmitting parts, the energizing current for a given torque can be only half of that required in clutches wherein the clutch plate is engaged from one side only.

The air gaps L1–L4 are bounded by large surfaces and, therefore, gap losses can be reduced to a minimum.

Referring finally to FIG. 7, there is shown a portion of a third magnetic clutch wherein the space between a pressure plate 55 and an axially movable armature 56 accommodates a plurality of clutch plates 57. In the illustrated embodiment, the clutch comprises two plates 57 separated by a lamination 58 of magnetically conductive material. The lamination 58 is movable axially of but rotates with the arms of the pressing plate 55. Otherwise, this clutch is identical with the clutching unit A of FIG. 1.

If the clutch is to transmit very high torque, the coils 20, 21 can rotate with the driving means so that they can lie against the pole rings of the clutch plate without the formation if any air gaps. Such rotary coils can receive current through the intermediary of slip rings or rolling current-supplying means.

The cutouts 13, 36 and 54′ prevent also a magnetic short circuit between the inner and outer pole rings.

What is claimed as new and desired to be protected by Letters Patent is:

1. A magnetic clutch comprising rotary driving means; rotary driven means arranged coaxially with said rotary driving means; a pressure plate rigid with said driving means; an axially movable armature connected with said driving means and arranged spaced from said pressure plate; a clutch plate consisting at least partially of a resilient material disposed between said pressure plate and said armature and connected for rotation with said driving means, said clutch plate comprising a circumferentially corrugated resilient disc of magnetically conductive material and a friction facing comprising segments of diamagnetic material provided on both sides of said disc facing, on the one hand, said pressure plate and, on the other hand, said armature; current-operated means for moving said armature against said clutch plate thereby flattening the same and maintaining it in frictional torque-transmitting engagement with said armature and said pressure plate when said current-operated means are energized; and spring means connecting said armature to said driving means and arranged to bias said armature away from said frictional torque-transmitting engagement with said clutch plate when said current-operated means are deenergized, thereby permitting said corrugated clutch plate, due to the resiliency thereof, to reassume its corrugated shape and thereby to detach said segments of diamagnetic material facing said pressure plate from the same so as to avoid undesired sliding of said segments of said clutch plate along said pressure plate after deenergization of said current-operated means.

2. A magnetic clutch as defined in claim 1, wherein said pressure plate is provided with an annulus of cutouts and webs separating said cutouts, and said current-operated means forming a ring and said cutouts being disposed in an area between the internal and external diameters of said current-operated means.

3. A magnetic clutch as defined in claim 1, wherein said spring means comprise a set of leaf springs connecting said armature with said driving means and arranged to bias said armature away from frictional engagement with said clutch plate.

4. A magnetic clutch as defined in claim 1, wherein said spring means comprise first and second corrugated springs respectively interposed between said disc on the one hand and said armature and said pressing plate on the other hand to normally bias said segments away from said armautre and said pressure plate.

5. A magnetic clutch as defined in claim 1, further comprising coupling means connecting said pressure plate with said armature to limit movements of said armature axially and away from said clutch plate.

6. A magnetic clutch as defined in claim 1, further comprising a second clutch plate interposed between said first-mentioned clutch plate and said pressure plate, and a lamination interposed between said clutch plates, said lamination consisting of magnetically conductive material and being arranged to share rotary movements of said pressure plate.

7. A magnetic clutch as defined in claim 1, further comprising a second armature axially movably connected with said driving means, a second pressure plate rigid with said driving means, a second clutch plate interposed between said second armature and said second pressure plate, second driven means coaxial with said driving means and arranged to receive torque from said second clutch plate independently of said first mentioned clutch plate, and second current-operated means for moving said second armature against said second clutch plate to maintain the latter in frictional torque-receiving engagement with said second armature and said second pressure plate.

8. A magnetic clutch as defined in claim 7, wherein said current-operated means are adjacent to each other between said clutch plates and further comprising a stationary housing supporting said current-operated means and fastener means connecting said pressure plates to each other.

9. A magnetic clutch as defined in claim 8, wherein said pressure plates flank said current-operated means and comprise registering internally threaded portions, said fastener means comprising an externally threaded ring meshing with said portions.

10. A magnetic clutch comprising rotary driving means; rotary driven means coaxial with said driving means; a pressure plate rigid with said driving means; an axially movable armature connected with said driving means; a clutch plate disposed between said armature and said pressure plate and connected for rotation with said driven means, said clutch plate comprising a disk of magnetically conductive material, inner and outer pole rings provided at each side of said disk, and a friction facing of diamagnetic material provided at each side of said disk between the respective inner and outer pole rings, said disk having an annulus of windows disposed between said outer and inner pole rings and webs separating said windows from each other, said pressure plate being provided with axially parallel first recesses outwardly adjacent said disk and said armature being provided with radially arranged second recesses extending inwardly from the periphery thereof; coupling means connecting said pressure plate with said armature to limit movement of said armature axially and away from said clutch plate, said coupling means comprising substantially L-shaped pins each having a first leg received with friction in one of said first recesses and a second leg received with clearance in one of said second recesses; and current operated means for moving said armature against said clutch plate so as to maintain the latter in frictional torque-receiving engagement with said armature and said pressure plate.

11. A magnetic clutch as defined in claim 10, wherein each of said first legs comprises two mutually inclined sections and is in three-point contact with said pressure plate, each of said second legs being engaged by said armature at a point close to the outer end of the respective second recess when said armature bears against said clutch plate.

References Cited

UNITED STATES PATENTS

| | | |
|---|---|---|
| 2,014,362 | 9/1935 | Tatter. |
| 2,862,590 | 12/1958 | Schuman. |
| 2,899,037 | 8/1959 | Pierce. |
| 2,936,054 | 5/1960 | Simon et al. |
| 2,973,850 | 3/1961 | Jaeschke. |
| 3,037,601 | 6/1962 | Binder. |
| 3,066,781 | 12/1962 | Straub. |
| 3,307,666 | 3/1967 | Miller et al. |
| 3,310,141 | 3/1967 | Smirl. |
| 1,952,351 | 3/1934 | Armstrong. |

CARLTON R. CROYLE, *Primary Examiner.*

ALLAN D. HERRMANN, *Assistant Examiner.*

U.S. Cl. X.R.

192—84, 107, 111